United States Patent
Balandin (10) Patent No.: US 10,003,111 B2
(45) Date of Patent: *Jun. 19, 2018

(54) THERMAL INTERFACE COMPOSITE MATERIAL AND METHOD

(71) Applicant: The Regents of The University of California, Oakland, CA (US)

(72) Inventor: Alexander A. Balandin, Riverside, CA (US)

(73) Assignee: The Regents of the University of California, Oakland, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/276,604

(22) Filed: May 13, 2014

(65) Prior Publication Data

US 2014/0335382 A1 Nov. 13, 2014

Related U.S. Application Data

(60) Provisional application No. 61/822,789, filed on May 13, 2013.

(51) Int. Cl.
| | |
|---|---|
| *H01M 10/052* | (2010.01) |
| *H01M 10/613* | (2014.01) |
| *H01M 10/625* | (2014.01) |
| *H01M 10/655* | (2014.01) |
| *H01M 10/659* | (2014.01) |
| *F28D 20/02* | (2006.01) |
| *H01M 10/6551* | (2014.01) |
| *H01M 10/6554* | (2014.01) |
| *F28D 20/00* | (2006.01) |

(52) U.S. Cl.
CPC ...... *H01M 10/5044* (2013.01); *F28D 20/021* (2013.01); *H01M 10/613* (2015.04); *H01M 10/655* (2015.04); *H01M 10/659* (2015.04); *H01M 10/6551* (2015.04); *H01M 10/6554* (2015.04); *F28D 2020/0078* (2013.01); *H01M 10/052* (2013.01); *H01M 10/625* (2015.04); *Y02E 60/145* (2013.01)

(58) Field of Classification Search
CPC ............ H01M 10/625; H01M 10/655; H01M 10/6551; H01M 10/6554; H01M 10/613; H01M 10/052; H01M 10/659; Y02E 60/145

See application file for complete search history.

(56) References Cited

U.S. PATENT DOCUMENTS

| | | | | |
|---|---|---|---|---|
| 2003/0054230 | A1* | 3/2003 | Al-Hallaj | H01M 2/1094 429/120 |
| 2012/0135281 | A1* | 5/2012 | Choi | H01M 2/16 429/62 |
| 2014/0272489 | A1* | 9/2014 | Anandan | H01M 2/348 429/61 |

* cited by examiner

*Primary Examiner* — Brittany Raymond
(74) *Attorney, Agent, or Firm* — Schwegman Lundberg & Woessner, P.A.

(57) ABSTRACT

A composite thermal interface material and methods are shown. Devices such as lithium ion batteries incorporating composite thermal interface materials show significant improvement in cooling performance. In one example, composite thermal interface materials shown provide cooling through both a phase change mechanism, and a heat conducting mechanism which directs heat away from the device to be cooled, such as electrochemical cells in a battery, to an external housing and/or a coupled heat exchange device such as radiating fins.

11 Claims, 7 Drawing Sheets
(5 of 7 Drawing Sheet(s) Filed in Color)

THERMAL INTERFACE COMPOSITE MATERIAL AND METHOD

CLAIM OF PRIORITY

This application claims the benefit of priority under 35 U.S.C. § 119(e) to U.S. Provisional Patent Application Ser. No. 61/822,789, filed on May 13, 2013, which is incorporated by reference herein in its entirety.

TECHNICAL FIELD

This invention relates to thermal management materials and methods. This invention relates to thermal management materials and methods.

BACKGROUND

Heat management is an important operating factor for a number of electronic devices. One particular example of electronic device includes batteries such as high performance lithium ion batteries. One approach to managing heat in batteries includes utilization of phase change materials (PCMs) to absorb unwanted heat. However, many phase change materials have low thermal conduction properties relative to common heat transfer materials such as metals. Improved thermal management materials are desired for use in devices such as batteries or other electronic devices.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Li-ion batteries are components for progress in mobile communications and transport technologies. However, Li-ion batteries suffer from strong self-heating, which limits their life-time and creates reliability and environmental problems. Thermal management in batteries may rely on the latent heat stored in a phase change material as its phase changes over a small temperature range, thereby reducing the temperature rise inside the battery. In one example of the present invention, incorporation of graphene to a hydrocarbon-based phase change material allows an increase its thermal conductivity by more than two orders of magnitude while preserving its latent heat storage ability. A combination of latent heat storage together with the improved heat conduction outside of the battery pack leads to a significant decrease in the temperature rise.

Development of Lithium-ion (Li-ion) batteries enabled progress in mobile communications, consumer electronics, automotive and aerospace industries. Li-ion batteries are often used in hybrid electric vehicles (HEV) owing to their high energy densities and low weight-to-volume ratios. One of the most significant factors negatively affecting Li-ion battery performance is a temperature rise beyond a normal operating range. If overheated due to short-circuiting or fast charging/discharging processes the Li-ion battery can suffer thermal runaway, cell rupture or even explosion.

As noted above, one approach for thermal management of Li-ion battery packs is based on the utilization of phase-change materials (PCM). By varying the chemical composition of PCM a melting point and an operable temperature range as a heat absorber can be tuned. In one example, a thermal conductivity, K of a PCM includes values in the range of 0.17-0.35 W/mK at room temperature (RT). For comparison, the RT thermal conductivity of silicon and copper are ~145 W/mK and ~381 W/mK, respectively. PCMs store heat from the batteries rather than transfer it away from the battery pack. The use of PCM in battery cells also serves the purpose of buffering the Li-ion cell from extreme fluctuations in ambient temperature.

Figure 4:
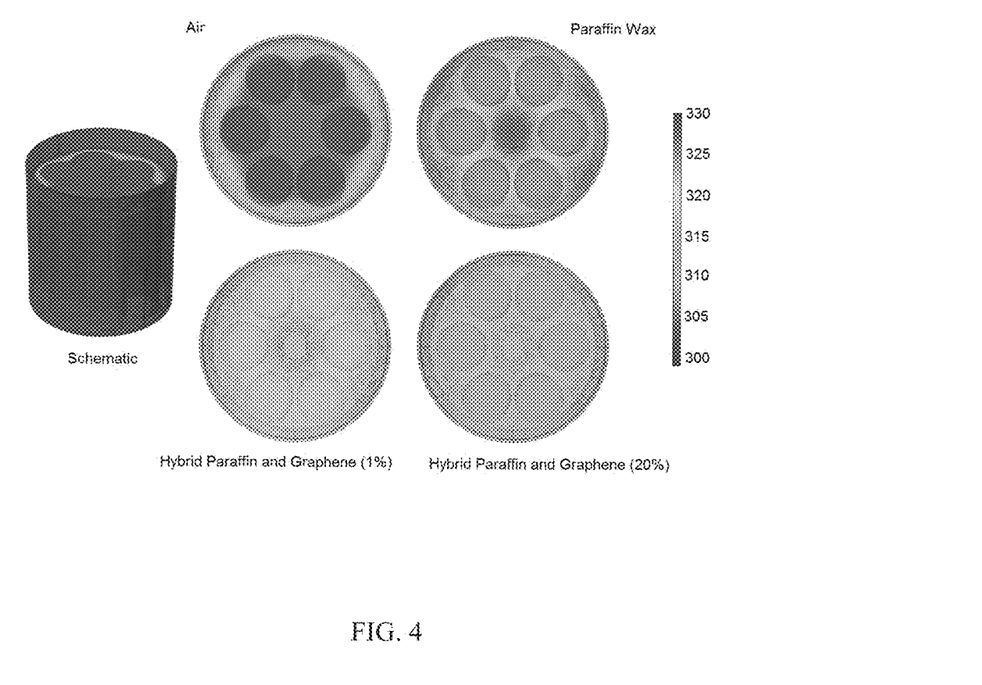
FIG. 4 shows modeled thermal performance of batteries using multiple cells and a thermal interface composite according to an example of the invention.

In one embodiment of the invention, a hybrid PCM is formed with graphene acting as filler for increased thermal conductivity. Graphene possesses extremely high intrinsic thermal conductivity and forms excellent binding with a variety of matrix materials. In one example, a graphene-enhanced hybrid PCM according to an embodiment of the invention reveals thermal conductivity that is two orders of magnitude higher than that of a PCM only, while preserving its latent heat storage ability. Utilization of the hybrid PCM results in substantial decrease of the temperature rise inside battery packs as shown in FIG. 4.

In one example, graphene is produced by a liquid phase exfoliation method. Although the following example is shown for preparation of experimental amounts, one of ordinary skill, having the benefit of the present disclosure, will recognize that amounts can be scaled up for production to any suitable amount.

First, 10 gm of natural graphite flakes were added to 100 mL of 2% w/v sodium cholate aqueous solution. In order to maximize the graphene—MLG dispersion, in one example, a high initial graphite concentration is used along with graphene. The dispersion is prepared under ice-cooling with high-power ultrasonication. ultrasonication can be performed using a Fisher Scientific Model 750 Sonic Dismembrator at a power level of 51-52 W. The ultrasonication was performed for ~12 hr in order to prepare an acceptable dispersion of graphitic material. In one example, longer sonication times result in smaller flakes which can be dispersed at higher concentrations. Continuous refilling of the bath water was required to maintain the sonication efficiency and prevent overheating. The process gives not only graphene and thin MLG sheets but also some fraction of thick graphene-graphite slurry. The solution was left to settle for ~1 hr to allow thick graphite flakes to sediment out of the solution. The top portion of the solution has a relatively homogeneous mixture, which is decanted. The next step is to remove a layer of graphite from the dispersion. The solution was centrifuged in filled 2 mL eppendrof tubes at 15 K-rpm for 5 minutes using Fisher Scientific Eppendorf 5424 Microcentrifuges. After centrifugation the top 1 mL was separated. The centrifuged graphene solutions were dried in a vacuum oven at 100° C. leaving a suspension of predominately MLG. The MLG suspension was dispersed in water followed by ~2 hr ultrasonication.

In order to demonstrate thermal properties with graphene an example paraffin wax (IGI-1260) was tested as a base PCM. Paraffinic hydrocarbons, or paraffins, are straight-chain or branching saturated organic compounds with the composition $C_nH_{2n+2}$. The term paraffin wax refers to mixtures of various hydrocarbon groups, particularly paraffins and cycloalkanes that are solid at ambient temperature. Paraffin has a high latent heat of fusion (200-250 kJ/kg) and a range of melting points suitable for thermal control of batteries and portable electronics. The IGI-1260 paraffin wax has relatively high melting and boiling points of $T_M$~70° C. and $T_B$~90° C., respectively. It consists of $C_{34}$-$C_{35}$ hydrocarbons, which are mainly composed of n-alkanes. The long hydrocarbon chains are responsible for its high density and melting point. When heated the IGI-1260 wax absorbs the heat to break the longer hydrocarbon chains into smaller ones.

Hybrid graphene-PCM composites, according to an example of the present invention, were prepared by dispersing a solution of a liquid-phase exfoliated (LPE) graphene and few-layer graphene (FLG) in the paraffin wax at 70° C. followed by the high-shear mixing on a hot plate (Corning PC-620D) with a magnetic stirrer. The preparation temperature was selected to avoid oxidation of the paraffin wax with formation of peroxide and water. The hybrid graphene-PCM was put in molds and allowed to solidify at RT under controlled humidity conditions. Three types of LPE graphene were used for the filler.

For low loading fractions up to 1%, a graphene solution with a graphene particle average thickness of one monolayer (0.35 nm) was used, and a lateral size distribution within the PCM in a range from 150 to 3000 nm with 550 nm average size. In the following examples, this material, which is predominantly single-layer graphene, is referred to as graphene filler type A.

For high loading fractions up to 20%, two other types of FLG were used. The graphene filler had an average FLG flake thickness of ~1 nm, which constitutes about 3 atomic planes with an average lateral dimension of ~10 μm. In the following examples, this material, which is predominantly single-layer graphene, is referred to as graphene filler type B.

In the following examples, a graphene filler type C had an average flake thickness of 8 nm, which constitutes 20-30 atomic planes with a lateral size in the range of 150 and 3000 nm with ~550-nm average.

Figure 1:
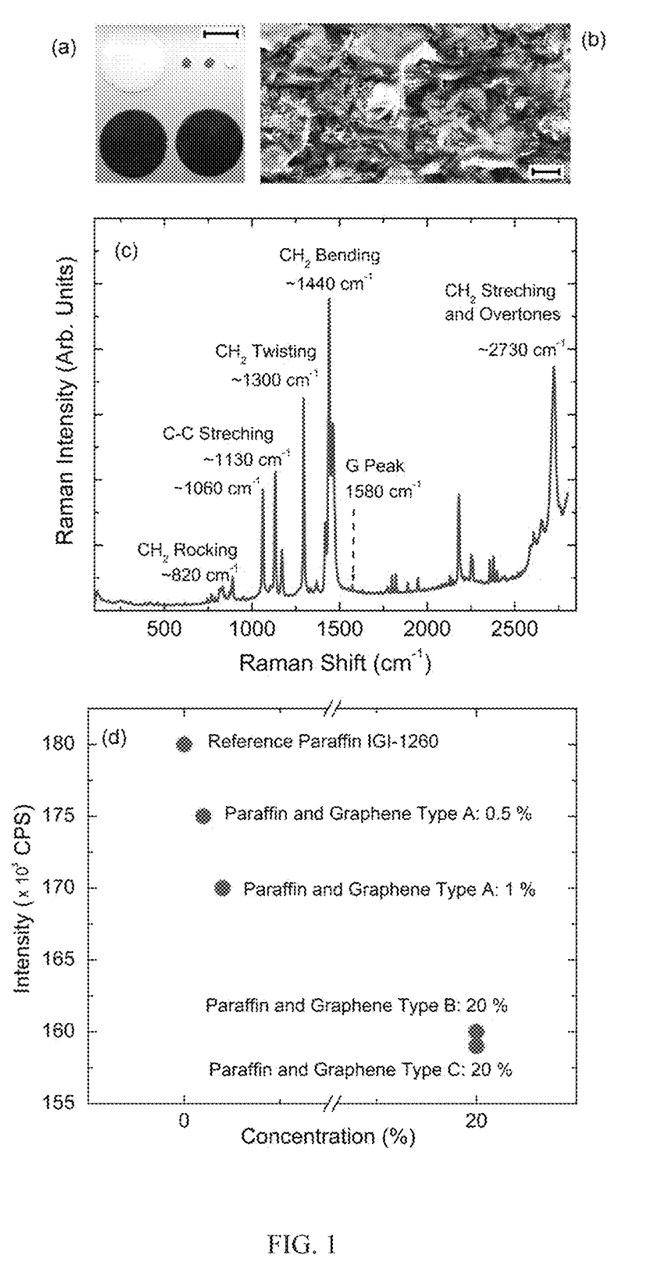
FIG. 1 shows images and graphs characterizing a composition of a thermal interface composite according to an example of the invention.

FIG. 1 shows a composite thermal interface material including graphene dipersed within a paraffin phase change material according to an example of the invention. Shown in (a) is an optical image of the PCM samples showing the change in color with increasing graphene content. The color of the disks changes from white to black as the fraction of graphene increases. (b) shows a scanning electron microscopy image of the hybrid graphene-PCM indicating uniform distribution of the graphene flakes. (c) shows a Raman spectrum of the graphene-paraffin composite. The main bands are indicated in the legends. The graphene G peak is weak compared to hydrocarbon signatures due to its small concentration and smaller scattering cross-section. (d) shows an X-ray photoelectron spectroscopy data for pristine paraffin and the hybrid composites. The intensity of the signal from the hydrocarbon chains, determined via 284.9 eV peak of a 1s-orbital electron, is decreasing with increasing concentration of sp2 carbon of graphene and few-layer graphene.

Figure 2:
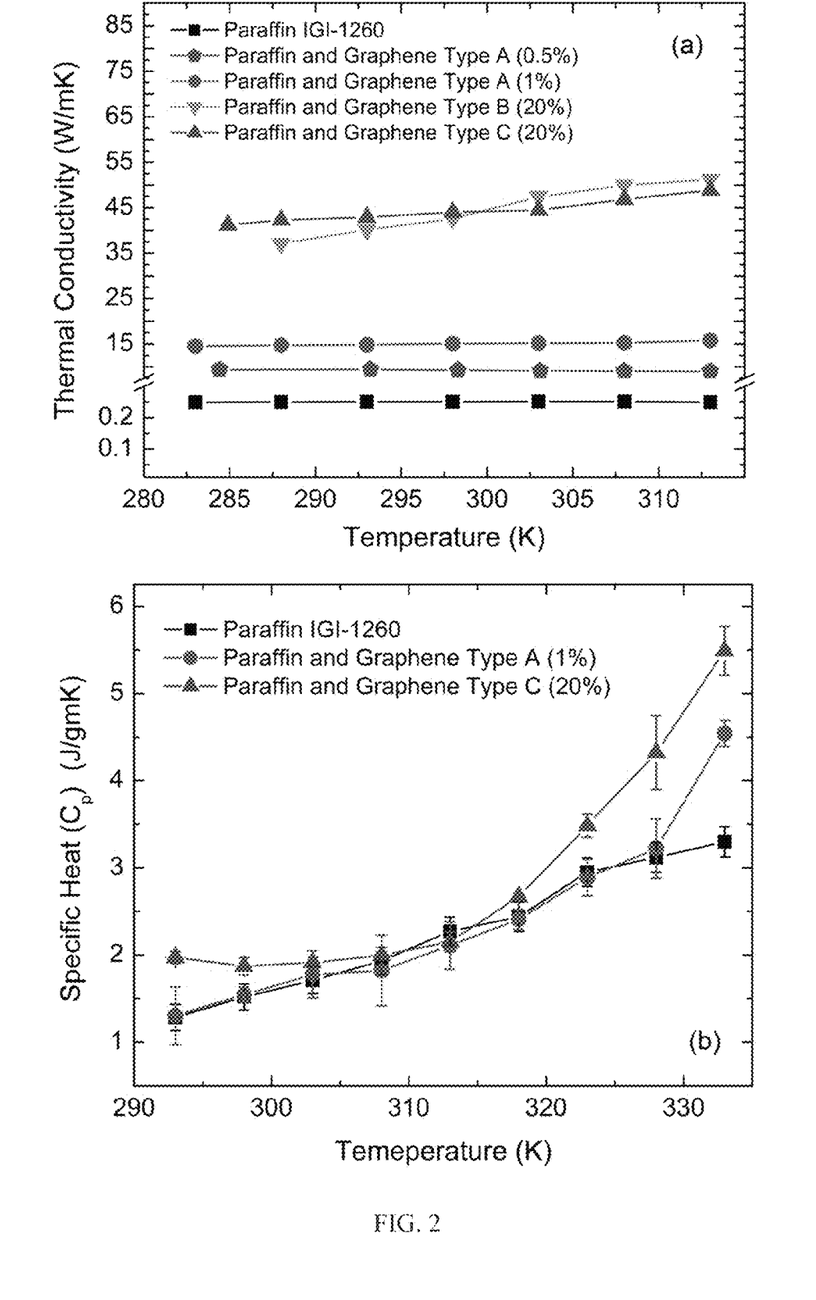
FIG. 2 shows graphs of thermal properties of a thermal interface composite according to an example of the invention.

FIG. 2 shows thermal properties of a composite thermal interface material.

(a) shows thermal conductivity of the composite thermal interface material with different graphene loading as the function of temperature. The results for pristine paraffin (IGI-1260) are also shown for comparison. (b) shows specific heat of the composites and reference pristine paraffin as the function of temperature.

The thermal conductivity of the hybrid composites was measured using the transient planar source (TPS) technique (Hot Disk TPS2500). The TPS system was calibrated by measuring reference samples with known thermal conductivity. We also compared the results of our measurements with those obtained by other experimental techniques such as "laser flash" and "3-omega". More than ten samples were investigated for each loading fraction to ensure reproducibility.

The measurements were performed by sandwiching an electrically insulated flat nickel sensor with the radius 14.61 mm between two identical samples of the same composition. The size of the samples was optimized for the sensor radius. The sensor acted as the heat source and temperature monitor simultaneously. Thermal properties of the material were determined by recording temperature rise as a function of time using the equation $$\overline{\Delta T(\tau)} == P\left(\pi^{\frac{3}{2}}rK\right)^{-1} D(\tau),$$

where $\tau=(t_m \alpha/r^2)^{1/2}$, $\alpha$ is the thermal diffusivity, $t_m$ is the transient measurement time, r is the radius of the sensor, P is the input heating power, and $D(\tau)$ is the modified Bessel function. The time and the input power were chosen so that the heat flow is within the sample boundaries and the T rise of the sensor is not influenced by the outer boundaries of the sample.

The measured thermal conductivity for the pristine paraffin was K=0.25 W/mK, which is in agreement with the literature values. A drastic increase of K is shown in the composites with the addition of graphene-FLG filler. The thermal conductivity of the hybrid graphene-PCM reaches ~15 W/mK at RT with the small 1 wt. % loading fraction. This is a significant increase by a factor of 60. The highest value achieved at 20 wt. % loading was ~45 W/mK, which is more than a two order magnitude of enhancement.

From FIG. 2(a), the thermal conductivity enhancement factor, $\eta=(K-K_m)/K_m$, of about 60 at the 1 wt. % loading fraction is exceptionally high compared with the values reported for either PCMs with other fillers or semiconductor thermal interface materials (TIMs). (K is the measured thermal conductivity of the composite and $K_m$ is the thermal conductivity of the paraffin matrix). In one example, the strongly increased thermal conductivity of the composite is facilitated by easy attachment of hydrocarbon molecules to graphene flakes at the experimentally determined processing temperature. The $C_nH_{2n+2}$-graphene attachment reduces the thermal interface resistance between the matrix material and filler. Modification of some of the Raman signatures of paraffin after addition of graphene is consistent with this assertion. Graphene has a much lower thermal Kapitza resistance, $R_B = \Delta T/(Q/A)$, with many matrix materials as compared to carbon nanotubes (here $\Delta T$ is temperature differences between two materials forming an interface, Q is the heat flux and A is the surface area).

In present embodiments using paraffin and graphene, the thermal coupling between the matrix and filler is likely even stronger than in other matrix-filler combinations. The ab initio density function theory calculations and molecular dynamics simulations suggest the possibility of extraordinary enhancement of thermal conductivity in ordered graphene composites with organic matrix where the heat transport is along the direction of the graphene planes: $K/K_m \approx 360$ at graphene loading of 5%. In one example, the thermal conductivity in the direction perpendicular to the graphene planes almost does not change. The strong anisotropic increase in the heat conduction can be attributed to graphene's planar geometry and strong coupling to the octane molecules resulting in a corresponding decrease in the Kapitza resistance. This means that heat carrying phonon modes excited in graphene can couple well to those in organic molecules. In one example, even randomly oriented graphene flakes produce a significant increase in the thermal conductivity of composites.

Thermal conductivity of all composites tested revealed only weak temperature dependence, which is beneficial for PCM practical applications. This weak dependence is expected for disordered materials. In one example, any changes in $T_M$ due to graphene loading are adjusted.

Specific heat, $C_p$, measurements (NETZSCH) were performed with a set of the samples with the thicknesses of 1 mm-1.6 mm to ensure that their thermal resistances were much larger than the contact thermal resistances. As a control experiment, specific heat of pristine paraffin wax was measured. FIG. 2(b) presents the specific heat data in the examined temperature range. The specific heat for the reference paraffin wax is ~2 kJ/kgK at RT, which is consistent with literature values. Near RT, the specific heat does not change much with the addition of graphene filler. The difference appears in the higher temperature range. Embodiments of hybrid graphene-PCM from FIG. 2(b) show larger specific heat than the reference paraffin. The growth of $C_p$ at the temperature increases above 320-330 K is expected. In paraffins, the specific heat starts to increase as temperature approaches $T_M$ and then falls off again.

Additional testing was performed using six 4-V Li-ion cells with the capacity of 3000 mAh each placed in a standard aluminum battery pack. The measurements were performed with the charger-discharger setup (HYPERION) and the temperature probes (Extech SDL200) that logged temperature for the assigned time intervals. The first two temperature probes were placed inside the battery pack, the third probe was connected to the battery pack shell acting as the heat sink and the fourth probe was used to collect the ambient temperature data. During the measurements the batteries were charging-discharging at 16 A and 5 A, respectively. The first control experiment was performed with pristine paraffin wax, which was melted and poured into the aluminum cylinder containing Li-ion battery cells. Special care was taken to ensure that the wax completely filled the space between the cylinders as in conventional battery designs. The battery pack with paraffin was allowed to cool to RT and then tested through ten charge/discharge cycles. The experiments with the hybrid graphene-PCM followed the same protocol.

Figure 3:
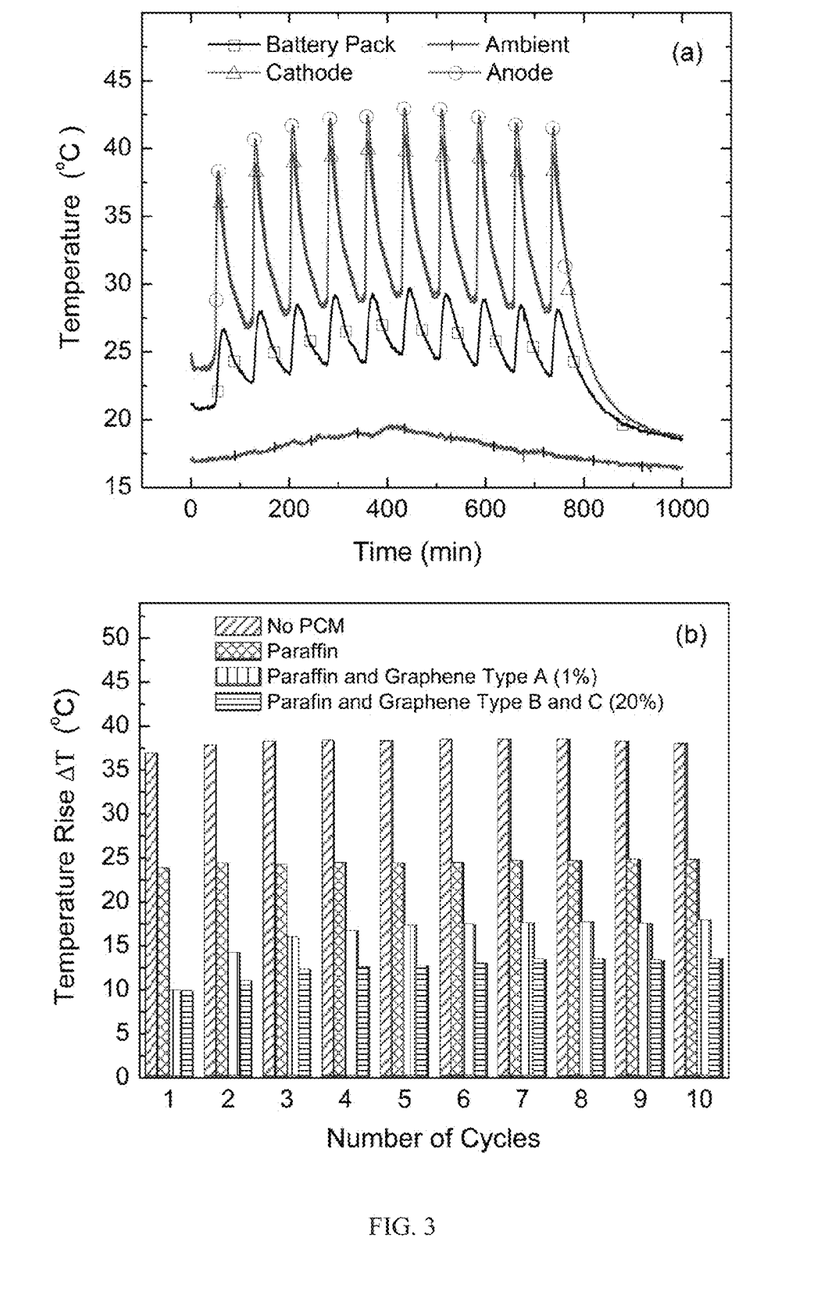
FIG. 3 shows graphs of temperature in example batteries using a thermal interface composite according to an example of the invention.

FIG. 3 shows utilization of the composite thermal interface material for thermal management of Li-ion battery pack. (a) shows measured temperature fluctuations inside and outside the battery pack with reference paraffin used as the phase change material. The temperatures are recorded at the battery cylinder cathode (blue), battery cylinder anode (circles) and battery pack shell (squares). The ambient temperature charge during the measurement is also shown (vertical lines). (b) shows a diagram of the temperature rise inside the Li-ion battery pack during the first ten charging-discharging cycles for the battery pack without PCM (diagonal lines), with conventional paraffin PCM (crosshatch), with the hybrid graphene-PCM at 1 wt. % loading (vertical lines) and with the hybrid graphene-PCM at 20 wt. % loading (horizontal lines). Note that the developed hybrid graphene-PCM strongly reduces the temperature rise inside the battery by simultaneously absorbing the heat and conducting it to the outside shell. The reduction in the temperature rise can be made stronger with a proper design of the outside heat sink.

In FIG. 3(b), one can see that when no PCM was used in the battery pack (the heat dissipates through the air and metal bottom of the pack) the temperature rise inside the battery (sensor attached to anode/cathode) is the highest: $\Delta T \sim 37°$ C. The use of conventional PCM results in the decrease of the temperature rise to ~24° C. The Li-ion battery pack with the developed hybrid graphene-PCM reveals the lowest temperature rise of ~10° C. during the first cycle. The temperature rise increases to ~16° C. after the third cycle and saturates at this value. The temperature rise for the case of the hybrid graphene-PCM with the larger loading fraction saturates at ~13° C. One should note here that the outside shell (battery pack) made of thin aluminum was not an optimized heat sink. Attachment of the outside shell to a good heat sink would make the improvement in thermal management with the hybrid graphene PCM even more pronounced.

The dependence of $\Delta T$ on the number of cycles, observed in FIG. 3(b), reflects the physical mechanisms behind the cooling action of conventional PCM and the hybrid graphene-PCM. The conventional PCM mostly absorbs the heat from the battery cylinders conducting only its small portion to the battery pack shell. The hybrid graphene-PCM stores and conducts heat simultaneously. This results in lower $\Delta T$ inside the battery pack but also increases the temperature of the outside shell. The increasing temperature of the shell results in some increase in $\Delta T$ inside the battery as well. In the experiment of FIG. 3, the outside shell, which constitute the battery pack, was not coupled to any specially designed heat sink. In embodiments such as automotive and aerospace applications a proper thermal connection of the battery packs to heat sinks (e.g. to the heavy vehicle frame in HEVs) is made.

FIG. 4 shows a numerical simulation of temperature rise inside a battery pack. Simulated temperature profiles in Li-ion battery packs obtained using the measured values of the specific heat and thermal conductivity. The simulation data are in agreement with the experiments.

The results shown in FIG. 4 were tested using (COMSOL) software for the four cases, which corresponded to the conducted experiments. In the case of no PCM between the battery cylinders and the outside shell, the temperature in the cylinders is at its maximum of above 330 K. The outer shell also heats up to ~315 K via conduction through the air. The use of the standard paraffin wax reduces the temperature of the cylinders to around 320 K without heating the outside shell. Thermal management with hybrid graphene PCM results in the lowest temperature of the battery cylinders of ~310-315 K with some increase in the temperature of the outside shell. The temperature profile is much more uniform when the hybrid graphene PCM is used.

Figure 5:
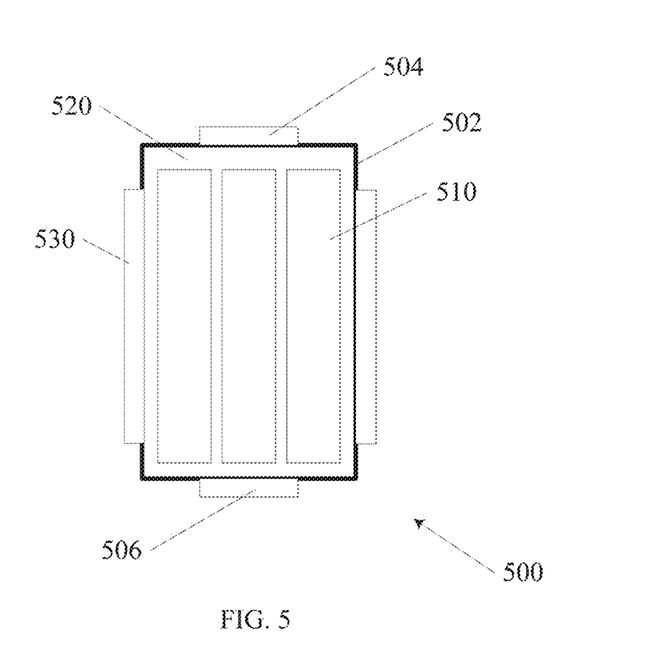
FIG. 5 shows a battery using a thermal interface composite according to an example of the invention.

FIG. 5 shows an example of a battery according to an embodiment of the invention. A battery 500 is shown including a number of individual electrochemical cells 510 coupled between an anode 504 and a cathode 506. In one example, the cells 510 include lithium-ion cells. Although a multi-celled battery 500 is shown as an example, the invention is not so limited. For example, a single cell battery is also within the scope of the invention. The battery 500 houses the cells 510 within a housing 502. In one example, the housing 502 is formed from a metal material, such as aluminum or steel. Although a number of geometries of housing 502 are possible, in one example, the housing 502 is formed as a cylinder.

In one example, the housing 502 itself is a heat conducting housing. In one example, the housing 502 is coupled to other heat conducting structures, such as cooling fins 530 that are in thermal contact with a thermal interface composite 520 as described in examples above. In one example, the thermal interface composite 520 includes a hydrocarbon matrix material and a number of graphene particles dispersed within the hydrocarbon matrix material.

The thermal interface composite 520 is shown in thermal contact between the electrochemical cells 510 and the housing 502 and/or cooling fins 530. As described in examples above, in operation, the thermal interface composite 520 both absorbs heat by utilizing a phase change, and conducts heat away from the cells 510 to the housing and/or cooling fins. In one example, the heat is further conducted to ambient. In other examples, the heat may be further conducted to an additional heat sink, such as an electric vehicle frame, or other structure for dissipation.

Although battery is used as an example, thermal interface composites as described can be used to cool a number of devices, including ultracapacitors or supercapacitors, or other devices generating heat, that benefit from efficient cooling.

Figure 6:
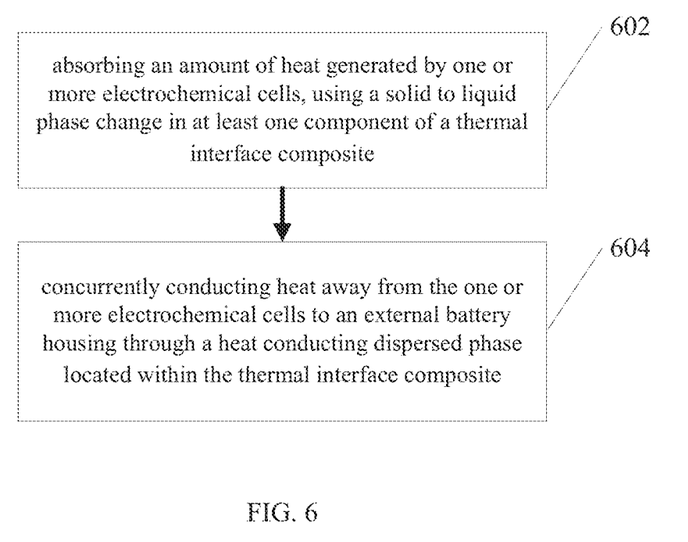
FIG. 6 shows an example method of cooling a battery using a thermal interface composite according to an example of the invention.

FIG. 6 shows an example method of cooling a battery using a composite thermal interface material as described in embodiments above. In operation 602, an amount of heat generated by one or more electrochemical cells is absorbed using a solid to liquid phase change in at least one component of a thermal interface composite. In operation 604, heat is concurrently conducted away from the one or more electrochemical cells to an external battery housing through a heat conducting dispersed phase located within the thermal interface composite.

Figure 7:
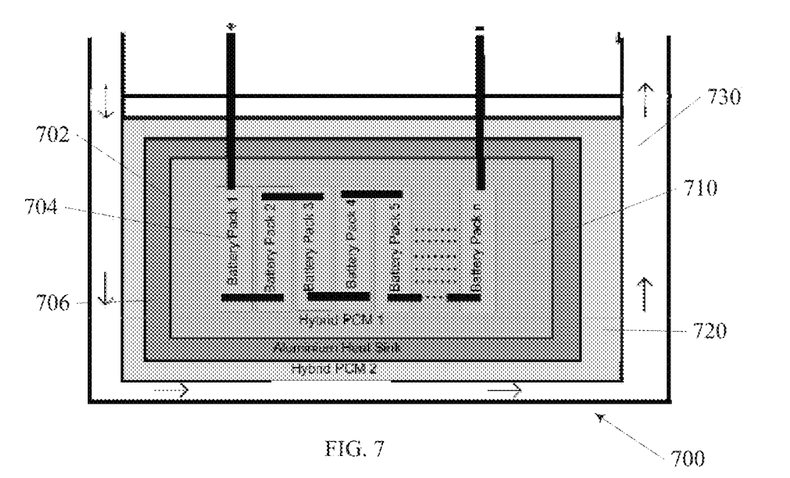
FIG. 7 shows a system using a thermal interface composite according to an example of the invention.

FIG. 7 shows a system 700 including a battery 702, with a number of cells 704, similar to the battery described in FIG. 5 above. System 700 includes a thermal interface composite 710 in thermal contact between the cells 704 and a housing 706. In one example, system 700 further includes a second thermal interface composite 720 in thermal contact between the housing 706 and a heat exchanger 730. In one example, the heat exchanger 730 includes circulating fluid that passes to a radiator, or similar structure. In one example, the heat exchanger 730 includes circulating air that may be passively circulated, or actively circulated using a fan or the like.

Figure 8:
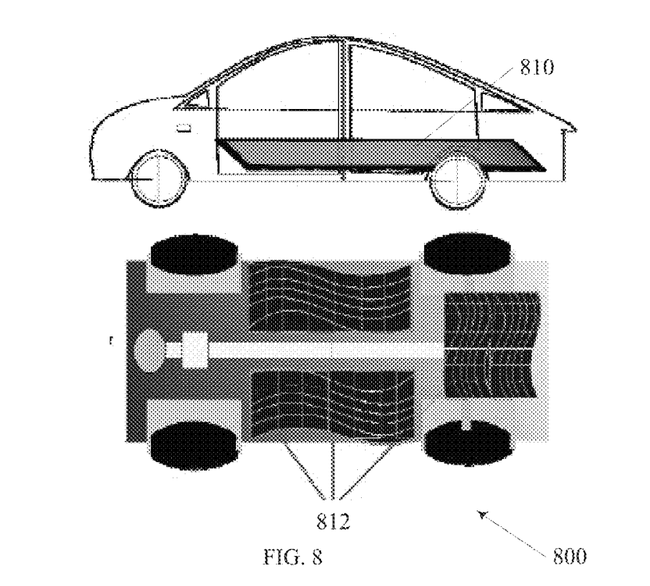
FIG. 8 shows a vehicle using a thermal interface composite according to an example of the invention.

FIG. 8 shows one possible application of a battery using a thermal interface composite according to examples described herein. An electric, or at least partially electric vehicle 800 is shown. In one example the vehicle 800 one or more batteries 810, similar to batteries such as shown in FIG. 5 or FIG. 7. In one example, the battery 810 is coupled to a heat exchanger 812. Examples of heat exchangers may include, but are not limited to, fins and/or circulating fluid or air that may pass in thermal contact with fins to increase cooling efficiency.

Thermal performance of composite thermal interface materials as described is exceptionally high compared with other dispersed phases. The inventors of the present materials and methods have discovered unexpected thermal performance using a hydrocarbon matrix material and a dispersed phase including graphene. The $C_nH_{2n+2}$-graphene attachment reduces the thermal interface resistance between the matrix material and filler. For example, graphene has much lower thermal resistance as compared to carbon nanotubes.

In the case of paraffin and graphene the thermal coupling between the matrix and filler is even stronger than in other matrix-filler combinations. In one example the unexpectedly high thermal performance results from heat carrying phonon modes excited in graphene that can couple well to those in organic molecules. In one example, even randomly oriented graphene flakes produce a significant increase in the thermal conductivity of composites as described.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:
1. A battery, comprising:
   a plurality of electrochemical cells coupled between an anode and a cathode;
   a heat conducting housing located around the plurality of electrochemical cells; and
   a thermal interface composite in thermal contact between the plurality of electrochemical cells and the heat conducting housing, wherein the thermal interface composite includes;
   a hydrocarbon matrix material; and
   a number of uniformaly distributed graphene particles having an average flake thickness of 8 nm, with a lateral size in that range of 150 and 3000 nm dispersed within the hydrocarbon matrix material.

2. The battery of claim 1, wherein the plurality of electrochemical cells includes a number of lithium ion cells.

3. The battery of claim 1, wherein the heat conducting housing includes a metallic housing.

4. The battery of claim 3, wherein the heat conducting housing includes an aluminum housing.

5. The battery of claim 4, wherein the heat conducting housing includes an aluminum cylinder.

6. The battery of claim 1, further including one or more cooling fins coupled to the heat conducting housing.

7. The battery of claim 1, wherein the hydrocarbon matrix material includes a carbon backbone with between approximately 34 and 35 carbon atoms.

8. The battery of claim 1, wherein the number of graphene particles dispersed within the hydrocarbon matrix includes a loading percentage between approximately 1% and 20%.

9. The battery of claim 1, wherein a composite thermal conductivity of the thermal interface composite is between approximately 15 W/mK and 45 W/mK.

10. The battery of claim 1, wherein the number of graphene particles includes particles with a size distribution range between approximately 150 nanometers and 300 nanometers.

11. The battery of claim 1, wherein the hydrocarbon matrix material has a melting temperature of between approximately 60° C. and 80° C.

\* \* \* \* \*